United States Patent
Kato et al.

(10) Patent No.: US 6,738,160 B1
(45) Date of Patent: May 18, 2004

(54) PRINTING APPARATUS, PRINTING METHOD AND DATA PROCESSING METHOD

(75) Inventors: Masao Kato, Kawasaki (JP); Minako Kato, Yokohama (JP); Shuu Utzui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,020

(22) Filed: Oct. 25, 1999

(30) Foreign Application Priority Data

Oct. 27, 1998 (JP) .......................................... 10/306132

(51) Int. Cl.[7] .............................................. G06K 15/00
(52) U.S. Cl. ........................ 358/1.9; 358/3.22; 358/3.26
(58) Field of Search ........................ 358/1.9, 2.1, 3.09, 358/3.1, 3.22, 3.23, 3.26, 1.18

(56) References Cited

U.S. PATENT DOCUMENTS

| | | | |
|---|---|---|---|
| 4,313,124 A | 1/1982 | Hara ........................... 346/140 |
| 4,345,262 A | 8/1982 | Shirato et al. ............... 346/140 |
| 4,459,600 A | 7/1984 | Sato et al. ................... 346/140 |
| 4,463,359 A | 7/1984 | Ayata et al. .................. 346/1.1 |
| 4,558,333 A | 12/1985 | Sugitani et al. ............. 346/140 |
| 4,723,129 A | 2/1988 | Endo et al. ................... 346/1.1 |
| 4,740,796 A | 4/1988 | Endo et al. ................... 346/1.1 |
| 5,289,293 A | * | 2/1994 | Kato ........................... 358/457 |
| 5,351,137 A | | 9/1994 | Kato et al. ................... 358/457 |
| 5,506,698 A | * | 4/1996 | Nishihara .................... 358/445 |
| 5,534,930 A | * | 7/1996 | Jung ............................ 348/405 |
| 5,854,882 A | * | 12/1998 | Wang .......................... 395/109 |
| 6,359,706 B1 | * | 3/2002 | Arita ........................... 358/486 |
| 6,597,815 B1 | * | 7/2003 | Satoh .......................... 382/251 |

FOREIGN PATENT DOCUMENTS

| | | | |
|---|---|---|---|
| JP | 54-056847 | 5/1979 | |
| JP | 59-123670 | * 7/1984 | .............. B41J/3/04 |
| JP | 59-138461 | 8/1984 | |
| JP | 60-071260 | 4/1985 | |
| JP | 406125528 A | * 5/1994 | ............ H04N/5/92 |

* cited by examiner

Primary Examiner—Jerome Grant, II
(74) Attorney, Agent, or Firm—Fitzpatrick, Cella, Harper & Scinto

(57) ABSTRACT

In a printing system by using matrix pattern processing, a printing apparatus, a printing method and a data processing method are capable of uniforming the use frequency of each printing element and preventing the printing element from locally deteriorating while preventing noise or texture from occurring. In a system for printing an image on a printing medium in accordance with print data obtained through a development which develops quantized image data by using a pattern corresponding to the quantized level of the image data, more than one type of the pattern for one quantized level of the image data are prepared, and types of the patterns to be used when the image currently printed on the printing medium reaches a discontinuous area of the image are changed.

26 Claims, 16 Drawing Sheets

NO SELECTION OR CHANGE

PATTERN 1

SELECTION AND CHANGE

PATTERN 1                PATTERN 2

PATTERN 3                PATTERN 4

PRINTING APPARATUS, PRINTING METHOD AND DATA PROCESSING METHOD

This application is based on Japanese Patent Application No. 10-306132 (1998) filed Oct. 27, 1998, the content of which is incorporated hereinto by reference.

BACKGROUND OF THE INVENTION

1. Field of the Invention

The present invention relates to a printing apparatus and method using matrix pattern processing and a data processing method. More particularly, the present invention relates to a printing apparatus, a printing, method and a data processing method capable of uniforming the use frequency of each printing element (also referred to as printing component).

It is possible to use various types of printing elements as printing components in accordance with printing systems. For example, in case of an ink-jet printing system, it is possible to use a nozzle for ejecting ink from an ink ejection port as an ink-jet printing element. (Ejecting means for ejecting ink from a nozzle is also referred to as printing element.) Moreover, in case of the ink-jet printing system, it is possible to eject not only a printing ink but also a picture-quality improver for insolubilizing or coagulating color materials in the printing ink.

Moreover, the present invention can be applied to every unit using a printing medium such as paper, cloth, leather, nonwoven fabric, OHP sheet or the like, furthermore metal or the like. As specific applicable units, there are office units such as a printer, a copying machine and a facsimile machine, and industrial production units.

2. Description of the Related Art

As for a printing apparatus, resolution has been improved so far in order to improve image quality. However, a problem occurs that the data processing time by a host computer (host apparatus) or the data transfer time from the host computer to a printer (printing apparatus) increases because data content to be processed increases by improving the resolution.

The conventionally-known matrix printing method solves the above problem. This is a method of transferring image data to which relatively-low resolution processing and high-value quantization processing are applied by a host computer to a printer and developing received image data into print data corresponding to a predetermined dot matrix and printing the data. An example will be described below by referring to FIG. 8. FIG. 8 shows (A) high-resolution processing (600 ppi (pixel per inch)) and (B) matrix pattern processing (300 ppi) as processings by a host computer.

In case of the high-resolution processing (A), by performing quantization processing at 2 levels for 600 ppi, 4-dot printing unit is obtained for 300 ppi and actual printing-dot layouts include 16 types as shown in FIG. 8. Substantial concentration levels of the 16 types of layouts can be handled similarly to the number of dots "0" to "4" to be applied to a printing area every 4 dots (300 ppi) and the number of concentration levels becomes 5. Moreover, in case of the matrix pattern processing (B), by performing quantization at 5 levels for 300 ppi, each quantized level is assigned to the number of dots "0" to "4" to be applied to a printing area every 4 dots (300 ppi) as shown in FIG. 8. Thereby, even if data content is decreased, it is possible to perform gradation expression similarly to a printing result by the high-resolution processing.

However, the printing method using the matrix pattern processing (B) in FIG. 8 has the following problem.

That is, because the same matrix pattern (hereafter also referred to as pattern) is used for each concentration level, a difference occurs between use frequencies of a printing component (or an ink-jet printing element serving as a nozzle for ejecting ink in case of the ink-jet printing method). For example, in case of the dot layouts at level 1 and level 3 of (B) in FIG. 8, the use frequency of the nozzle forming upper-side dots becomes larger than that of the nozzle forming lower-side dots. In general, a printing element such as a nozzle is deteriorated in accordance with its use frequency.

To decrease the difference between use frequencies of the above printing element, there is a method of preparing a plurality of patterns for the same concentration level and properly selecting and using them. As an example of the method, a plurality of patterns for level 1 of the matrix pattern processing of (B) in FIG. 8 will be described by referring to FIGS. 9A and 9B. The dot layout at concentration level 1 includes patterns 2, 3, and 4 shown in FIG. 9B in addition to a pattern 1 corresponding to the pattern shown by (B) in FIG. 8 and therefore, includes the total of four patterns as dot patterns for expressing the same concentration level. By properly selecting and using these patterns, it is possible to uniform the use frequency of each nozzle while keeping a concentration level.

However, because the above method selects and uses a plurality of matrix patterns while printing an image, a problem occurs that the noise in a printed image increases or a texture occurs to deteriorate the image.

SUMMARY OF THE INVENTION

The present invention is made to solve the above problem and its object is to provide a printing apparatus, a printing method and a data processing method capable of uniforming the use frequency of each printing component while preventing noise or texture from occurring and preventing the printing component from locally deteriorating in a printing system using matrix pattern processing.

In the first aspect of the present invention, there is provided a printing apparatus for printing an image on a printing medium in accordance with print data obtained through a development which develops quantized image data by using a pattern corresponding to the quantized level of the image data, comprising:

setting means capable of selectively setting more than one type of the pattern for at least one quantized level of the image data;

detection means for detecting the discontinuous area of the image to be printed on the printing medium; and change means for changing types of the patterns to be set by the setting means when the image currently printed on the printing medium reaches the discontinuous area of the image to be detected by the detection means.

In the second aspect of the present invention, there is provided a printing method for printing an image on a printing medium in accordance with print data obtained through a development which develops quantized image data by using a pattern corresponding to the quantized level of the image data, comprising the steps of:

preparing more than one type of the pattern for at least one quantized level of the image data;

changing types of the patterns to be used when the image currently printed on the printing medium reaches a discontinuous area of the image;

developing the quantized image data to the print data in accordance with the pattern; and printing the image in accordance with the print data.

In the third aspect of the present invention, there is provided a data processing method for processing data to be used in a printing apparatus for printing an image on a printing medium, comprising the steps of:

quantizing an image data corresponding to the image to be printed on the printing medium;

detecting a discontinuous area of the image to be printed on the printing medium in accordance with the image data; and selecting a pattern corresponding to the quantized image data; wherein more than one type of the pattern corresponding to a predetermined quantized level is prepared, the pattern corresponding to the quantized image data is selected from among the more than one type of the patterns corresponding to the predetermined quantized level, and the selected pattern is changed in accordance with detection results of the detecting step.

The present invention makes it possible to uniform the use frequency of each printing element and prevent the printing element from locally deteriorating by preparing a plurality of matrix patterns for a quantized level of image data while preventing noise or texture from occurring by changing types of matrix patterns to be used when an image currently printed on a printing medium reaches the discontinuous area of the image.

The above and other objects, effects, features and advantages of the present invention will become more apparent from the following description of embodiments thereof taken in conjunction with the accompanying drawings.

BRIEF DESCRIPTION OF THE DRAWINGS

FIGS. 5A, 5B, and 5C are illustrations of other different examples of the matrix pattern in FIG. 4;

DETAILED DESCRIPTION OF THE PREFERRED EMBODIMENTS

Embodiments of the present invention will be described below by referring to the accompanying drawings.

(First Embodiment)

First, the general processing flow of a matrix pattern conversion method used for the present invention will be described by referring to FIGS. 1 to 4. This embodiment is an example when setting a matrix pattern conversion section into a printer driver of a host computer.

Figure 1:
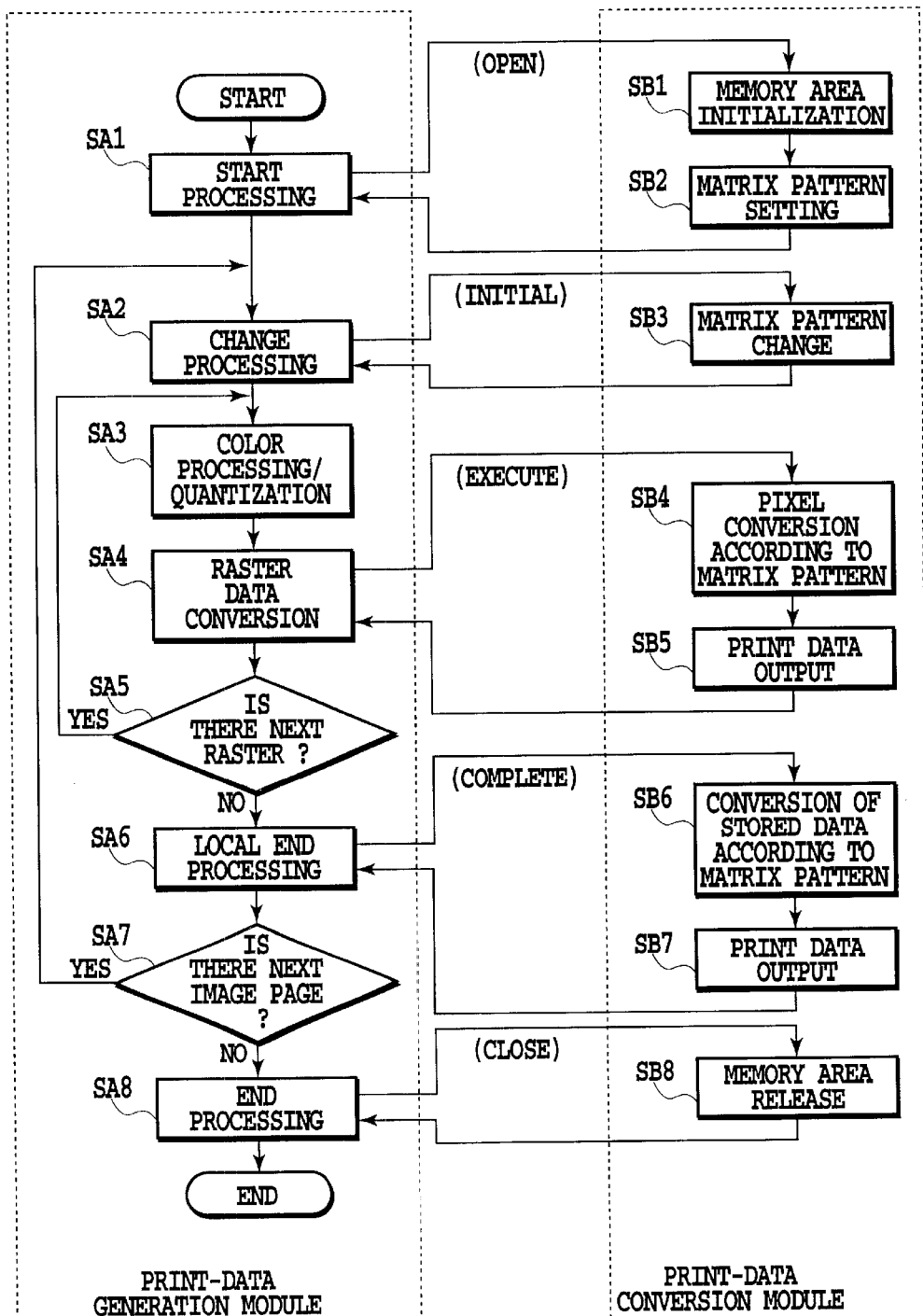
FIG. 1 is an illustration of a matrix pattern conversion method of a first embodiment of the present invention.

FIG. 1 shows the module configuration of the processing section of a printer driver, in which a print-data generation module M1 at the left side converts the image data supplied from an application into print data which can be printed by a printing apparatus. The right side in FIG. 1 denotes a print-data conversion module M2 for converting matrix patterns of the present invention. The module M2 is an example mounted for a function to be called from the print-data generation module M1.

By outputting a printing instruction (also referred to as printing command) to an application, the print-data generation module M1 is started to execute start processing (step SA1). In this case, the print-data generation module M1 is initialized to execute an open (Open) function for the print-data conversion module M2. The open function of the print-data conversion module M2 initializes a memory area (step SB1) and matrix patterns to determine a group of matrix patterns to be used (step SB2). The print-data generation module M1 receives image data from the application, determines a printing-mode processing method and the like to perform initialization, and executes an initial (Init) function for the print-data conversion module M2 (step SB3). The initial function of the print-data conversion module M2 changes matrix patterns to be mentioned later (step SB3).

Thereafter, the print-data generation module M1 executes color-processes and quantizes image data every raster to convert the data into print data that can be printed by a printing apparatus (step SA3). After converting the raster data into print data, the module M1 executes an execute function (Exec) (step SA4). The executed function of the print-data conversion module M2 converts matrix patterns (step SB4) as described later and outputs print data (step SB5).

Moreover, the execute function decides whether the next raster data is present in the image data. When the next raster data is present, the execute function returns to the precedent step SA3 (step SA5). When the function completes the conversion of the image data into the print data, it performs local end processing such as initialization of some variables and executes the complete function of the print-data conversion module M2 (step SA6). The complete function of the print-data conversion module M2 applies matrix conversion to every print data stored in a memory (step SB6) and outputs matrix-converted print data (step SB7). Then, the complete function refers to page-feed codes and image data to decide whether the next page is present. When the next page is present, the complete function returns to the precedent step SA2 (step SA7). When the next page is not present, the end processing is performed. The end processing executes the close (Close) function of the print-data conversion module M2 (step SA8). The close function of the print-data conversion module M2 opens the memory area to complete the processing (step SB8).

Then, characteristic processings in the conversion module M2 will be described below in detail.

Figure 4:
FIG. 4 is an illustration of the matrix patterns in FIGS. 2 and 3.

FIG. 4 shows the relation between quantized data values and matrix patterns. For simplification of description, a case of using patterns 1 and 2 every page by changing them will be described in case of this embodiment. However, it is also possible to use three sets or more.

Figure 2:
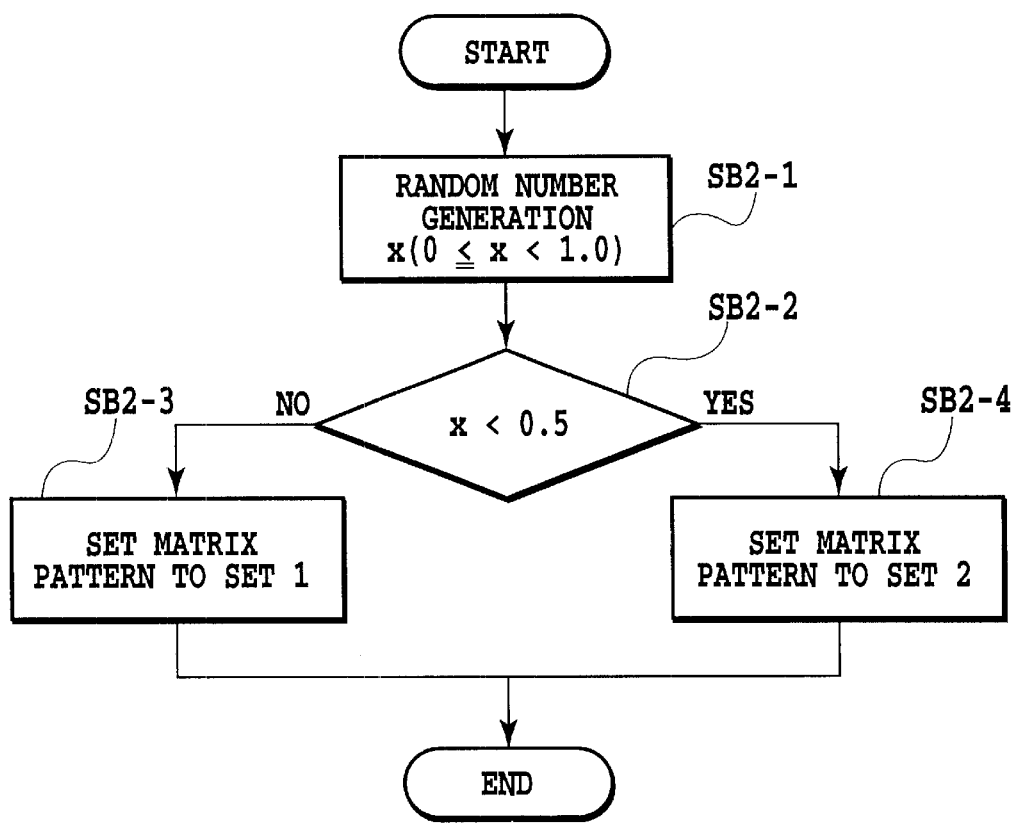
FIG. 2 is a flow chart for explaining setting of the matrix patterns in FIG. 1.

FIG. 2 shows the matrix-pattern initial value setting method in step SB2 in FIG. 1. First, a random number between "0" and "1" is generated (step SB2-1). When the random number is smaller than "0.5," the set 1 in FIG. 4 to be mentioned later is set as an initial matrix pattern (steps SB2-2 and SB2-3). On the other hand, when the random number is "0.5" or more, the set 2 in FIG. 4 to be mentioned later is set as an initial matrix pattern (steps SB2-2 and SB2-4). Therefore, even if the history of the last-time printing is unknown because a memory is initialized, for example, when data for only one page is printed or immediately after the switch of a host computer is turned on, the set 1 or 2 is selected as an initial matrix pattern by the probability conforming to a random number (in this case, the probability is equal to ½ ). Therefore, it is possible to eliminate deviated use of the set 1 or 2 and prevent the deviation of the use frequency of nozzles.

Figure 3:
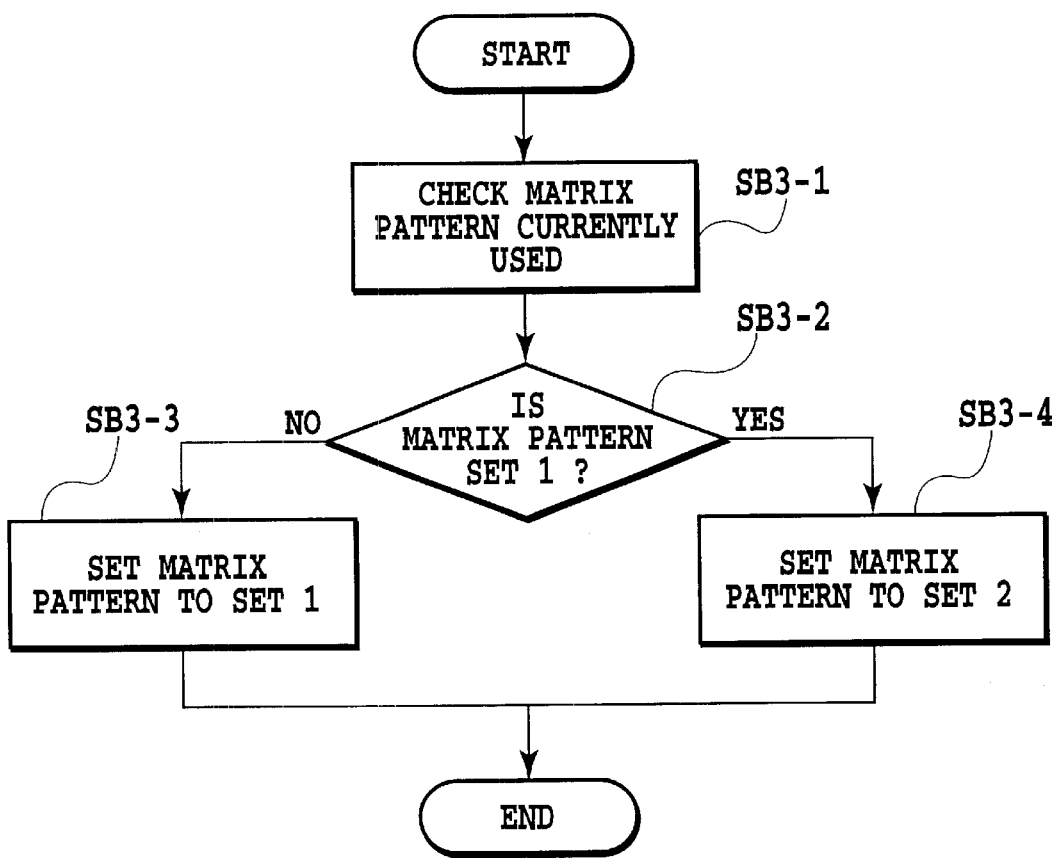
FIG. 3 is a flow chart for explaining change of the matrix patterns in FIG. 1.

FIG. 3 shows the change process of matrix patterns in step SB3 in FIG. 1. First, sets of matrix patterns current set are checked. Then, matrix patterns are changed by setting the set 2 when the set 1 is set and the set 1 when the set 2 is set. Thereby, sets of matrix patterns are changed between continuous pages and the deviation of the use frequency of nozzles is prevented. Moreover, when data for the first page is printed, it is unnecessary to change the sets through the above processing. Therefore, it is possible to omit the above processing for the first page.

FIG. 4 shows the relation between quantized data values and matrix codes in the processing in step SB4 in FIG. 1. That is, each quantized data value is replaced with a matrix code in accordance with the set information (sets 1 and 2) for already set matrix patterns. The printing apparatus develops dot layouts in accordance with the matrix code. The configuration of the development is already stored in the printing apparatus so as to correspond to the processing in FIG. 2 or the set information for the relation between matrix codes and dot layouts is transmitted to the printing apparatus from a host computer before receiving print data from the host computer.

Figure 5A:
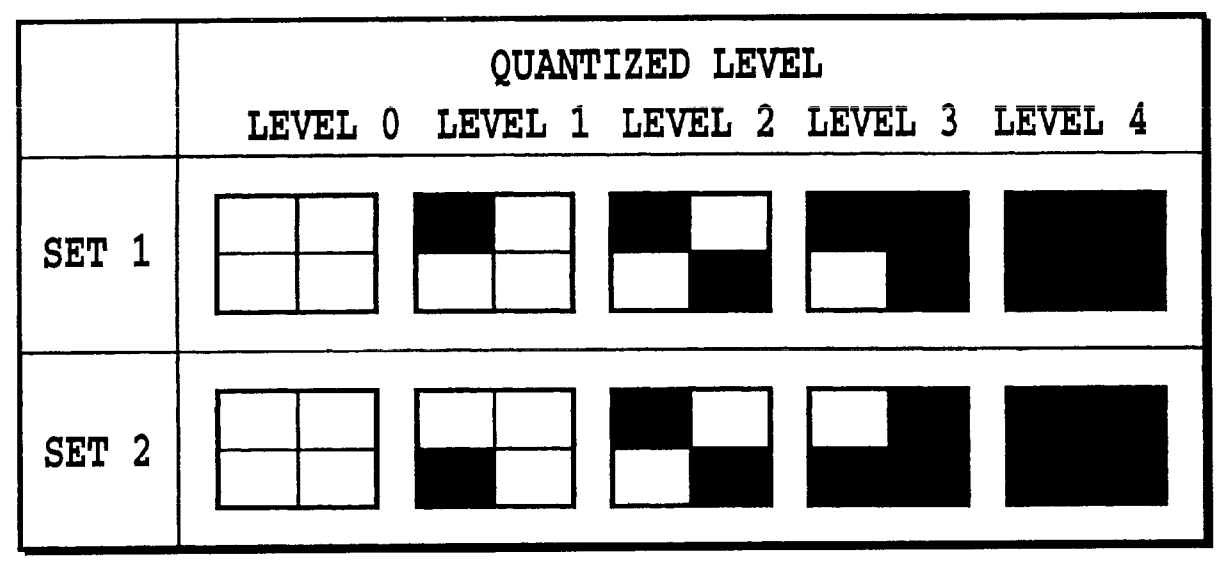
Figure 5B:
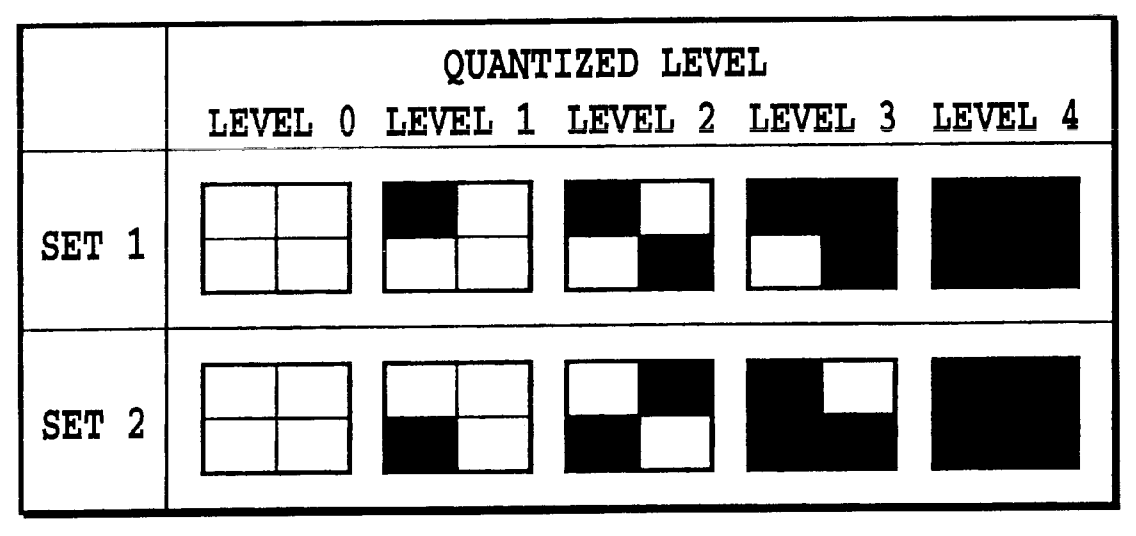
Figure 5C:
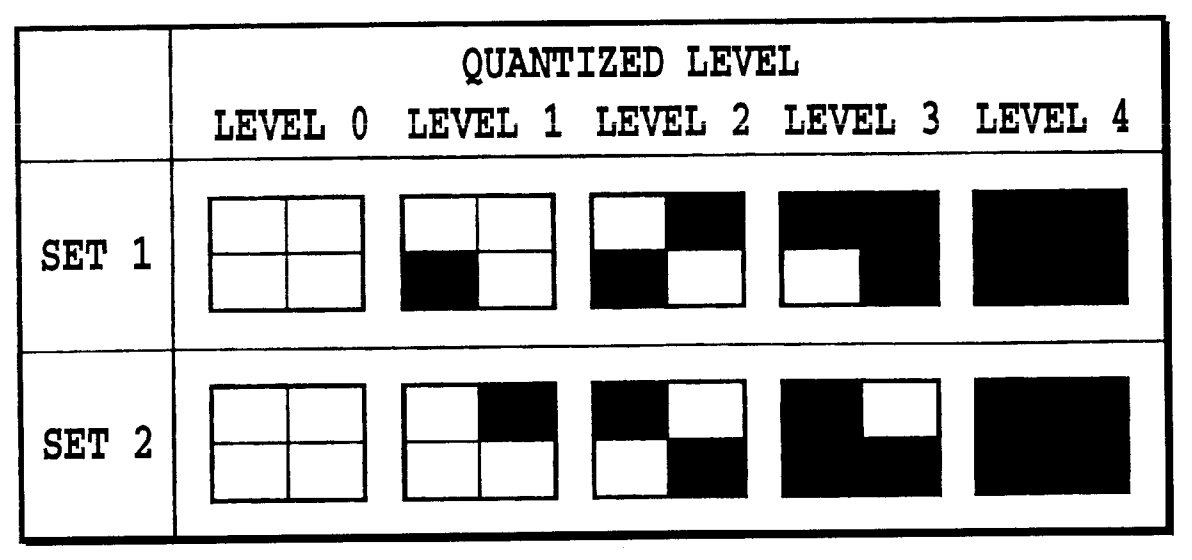

FIGS. 5A, 5B, and 5C show other examples with matrix patterns different from each other. In case of these examples, two sets of matrix patterns are prepared for quantization (concentration) levels of "0" to "4" and changed similarly to the case of the example in FIG. 4. Dot patterns showing the same quantized level are set so that the use frequency of nozzles is inverted in the sets 1 and 2. Moreover, it is also permitted to prepare more than two sets of matrix patterns different from each other and use them by changing them. In short, it is important that there is no deviation in nozzles used for a plurality of matrix patterns prepared.

As described above, by preparing a plurality of matrix patterns and changing types of matrix patterns, it is possible to uniform the use frequency of a nozzle serving as a printing component and prevent the local deterioration of the nozzles. Moreover, by changing matrix patterns between printing pages, noise or texture does not occur in a printed image or a problem in the conventional case of properly selecting and using a matrix does not occur.

This embodiment uses a random number for initialization of a matrix pattern as shown in FIG. 2 but it is not restricted to the above case. For example, it is also permitted to store the history of a matrix pattern used in accordance with any method and set a matrix pattern different from the last time in accordance with the history when starting data processing.

Figure 6A:
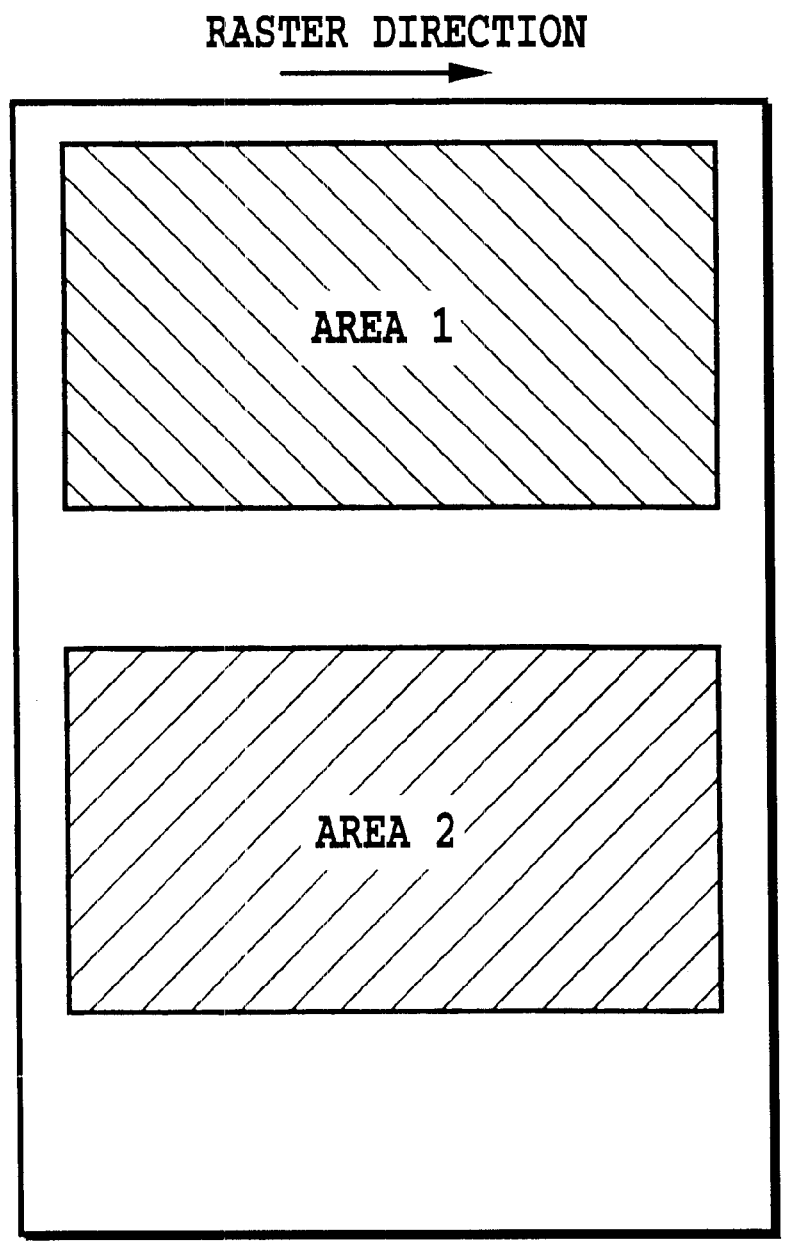
FIGS. 6A and 6B are illustrations of different examples of an image area on a printing medium.
Figure 6B:
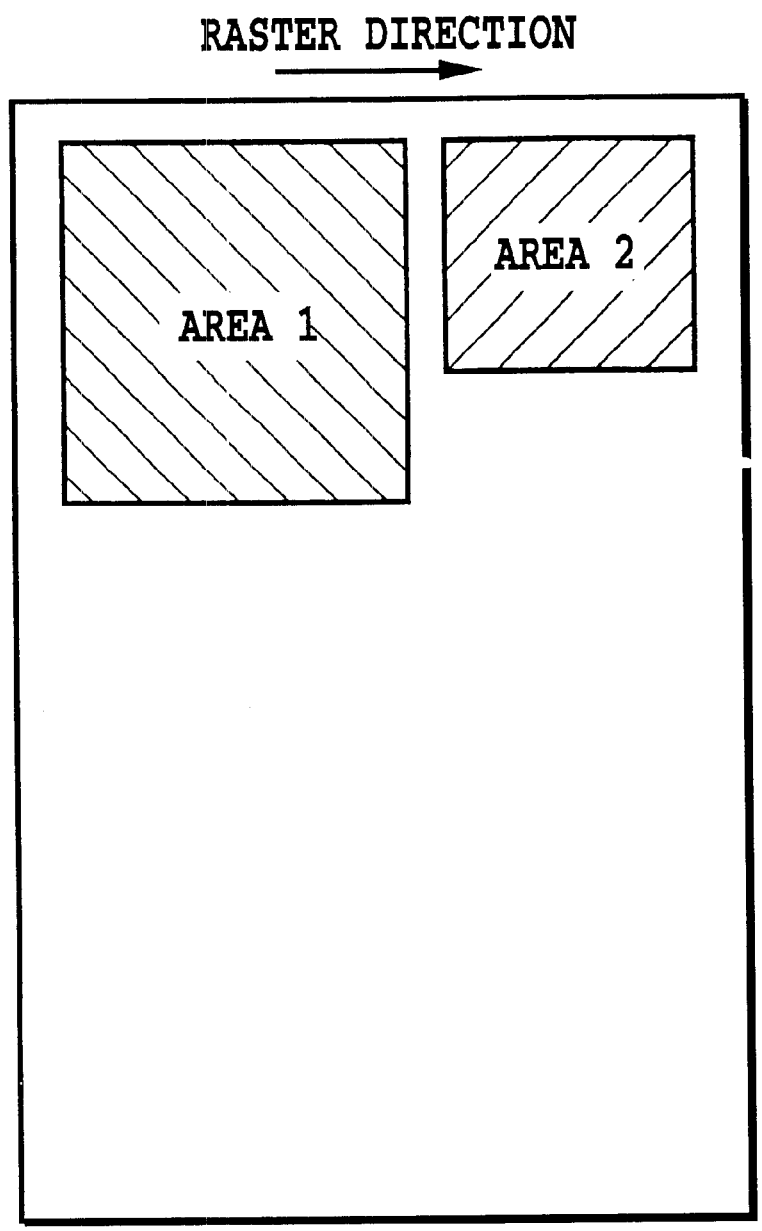

Moreover, this embodiment changes matrix patterns every page. However, the matrix pattern change timing is not restricted to the above case. FIGS. 6A and 6B show other examples of matrix-pattern change timing.

In case of the examples in FIGS. 6A and 6B, printed image are separated from each other in one page. That is, in case of FIG. 6A, the area 1 in which an image is previously printed and the area 2 in which an image is thereafter printed are separated from each other in one page. In case of FIG. 6B, printed images in the areas 1 and 2 arranged in the raster direction are separated from each other in one page. Therefore, when images are separated from each other, the same advantage as the case of the above embodiment is obtained even if sets of matrix patterns are replaced every separated image.

In case of FIG. 6A, it is also possible to use the matrix patterns of the set 1 in FIG. 4 for the image corresponding to the previous printing area 1 and the matrix patterns of the set 2 in FIG. 4 for the image in the subsequent printing area 2. Similarly, in case of FIG. 6B, because the image in the area 1 and the image in the area 2 are arranged in the crosswise direction (raster direction), it is possible to change the matrix patterns relating to the images in the areas 1 and 2. In case of FIG. 6B, it is possible to change matrix patterns to be used in accordance with the image in the area 1 or 2 within raster. Thus, matrix patterns are not changed in the same image but they are changed when a different image appears. Thereby, it is possible to uniform the use frequency of a nozzle serving as a printing component and prevent the local deterioration of the nozzles without generating noise or texture in a printed image. In this case, to distinguish between the image in the area 1 and the image in the area 2, it is possible to use a publicly known method such as the so-called object recognition method for distinguishing between vector data and bit map data. Even if this method is used, it does not influence what the present invention purposes.

The present invention purposes to uniform the use frequency of each printing component by preparing a plurality of types of matrix patterns and changing matrix patterns when an image discontinuity, that is, an image discontinuous area is detected and preventing noise or texture in a printed image while preventing the printing component from locally deteriorating.

(Second Embodiment)

Figure 7:
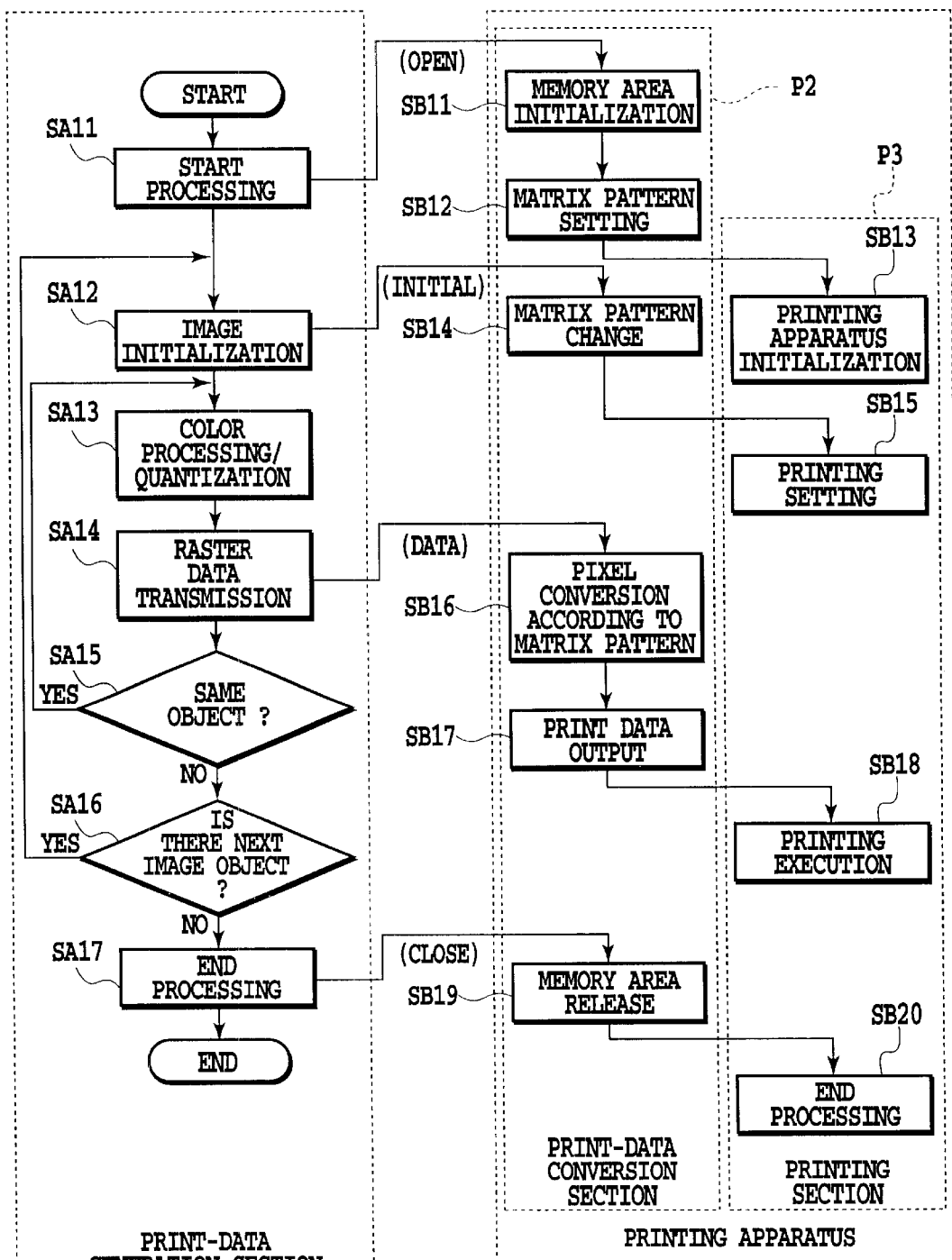
FIG. 7 is an illustration of a matrix pattern conversion method of second embodiment of the present invention.
Figure 8:
FIG. 8 is an illustration of a conventional image data processing system.
Figure 9A:
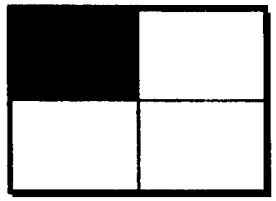
FIGS. 9A and 9B are illustrations of matrix patterns according to the processing system in FIG. 8.
Figure 9B:
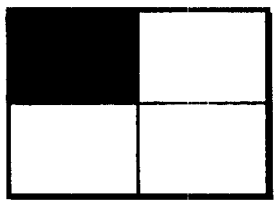
Figure 9B:
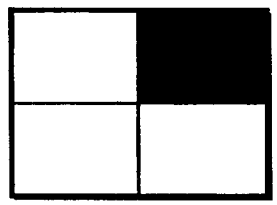
Figure 9B:
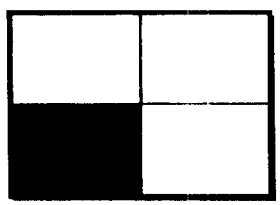
Figure 9B:
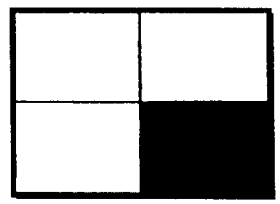

In case of the above first embodiment, matrix patterns are changed in the printer driver of a host computer. However, it is also possible to make a printing apparatus change matrix patterns. FIG. 7 shows an example of matrix pattern change by the printing apparatus.

FIG. 7 is an illustration of the processing when a matrix-pattern conversion section is set in a printing apparatus.

The left side of FIG. 7 shows a print-data generation section P1 in the printer driver of a printing apparatus, which performs the processing for converting image data supplied from an application into print data which can be printed in the printing apparatus. The right side of FIG. 7 shows a printing apparatus and its inside is divided into a print-data conversion section P2 and a printing section P3 serving as a portion other than the section P2. The print-data conversion section P2 performs matrix pattern conversion and the printing section P3 executes printing.

First, the print-data generation section P1 is started in accordance with a printing instruction to the application to execute start processing (step SA11). In this case, the print-data generation section P1 is initialized and an open (Open) command is transmitted to the printing apparatus. When the printing apparatus receives the open command, its print-data conversion section P2 performs the initialization of the memory area (step SB11) and the initialization of matrix patterns to determine sets of matrix patterns to be used (step SB12) and moreover, the printing section P3 performs initialization (step SB13). The print-data generation section P1 receives image data from the application, determines a method for processing a printing mode or the like to perform initialization, and transmits an initial (Init) command to the printing apparatus (step SA12).

When the printing apparatus receives the initial command, its print-data conversion section P2 changes sets of matrix patterns (step SB14) and the printing section P3 sets a printing mode (step SB15). The print-data generation section P1 executes color-processes and quantization process for image data every raster to convert the image data into print data (step SA13) and outputs the print data to the printing apparatus (step SA14). The print-data conversion section P2 converts the received print data in accordance with matrix patterns (step SB16) and outputs the converted print data (step SB17). The printing section P3 executes printing in accordance with the converted print data (step SB18).

The print-data generation section P1 decides whether the next raster data is an image object same as the present image object, that is, the next raster data is data for the same image. When the next raster data is the same object, the section P1 returns to precedent step SA13 (step SA15). When the next raster data is not the same object, the section P1 decides whether the next image object is present. When the next image object is present, the section P1 returns to precedent step SA12 (step S16). When the next image data is not present, the section P1 performs end processing and transmits a close (Close) command to the printing apparatus (step SA17). By receiving the close command, the printing apparatus opens the memory area (step SB19) and the printing section P3 performs end processing (step SB20).

As described above, this embodiment changes matrix patterns every image object. However, it is also permitted to change matrix patterns at the pause of a page similarly to the case of the above first embodiment. That is, it is preferable to uniform the use frequency of each printing component by detecting an image discontinuity, that is, an image discontinuous area and thereby changing matrix patterns in accordance with the detection and prevent noise or texture in a printed image while preventing the local deterioration of the printing components.

In the aforementioned embodiments, levels (N level) to be quantized have been described by way of example of five levels from level 0 to level 4. However, the present invention is applicable to a construction in which The quantizing is performed at two or more levels without being limited to the constructions as described in the embodiments. More preferably, the quantizing should be performed at three or more levels.

According to the present invention is characterized in that a plurality of patterns corresponding to a predetermined quantizing level is prepared, and a pattern employed corresponding to the predetermined quantizing level is changed as required. Therefore, the present invention is not limited to a position of a dot to be printed in the pattern corresponding to each of the quantizing levels and the pattern size.

(Third Embodiment)

Though the above first and second embodiments detect an image discontinuity in a printer driver, it is also permitted to detect the image discontinuity by a printing apparatus and convert matrix patterns. For example, it is permitted to perform printing by preparing a page counter for a printing apparatus, referring to the value counted by the counter, and changing matrix patterns every page. Moreover, it is permitted to perform printing by changing matrix patterns when an unprinted area in the feed direction of a sheet serving as a printing medium and image data after the unprinted area is present. In the latter case, however, if the width of an unprinted area to be detected is too small, matrix patterns differ in a relative small area for image before and after the unprinted area. Thereby, this may cause texture or image disturbance. Therefore, it is preferable to change matrix patterns when an unprinted area having a width of a certain value or more is detected.

(Configuration of Ink-jet Printing Apparatus)

Figure 10:
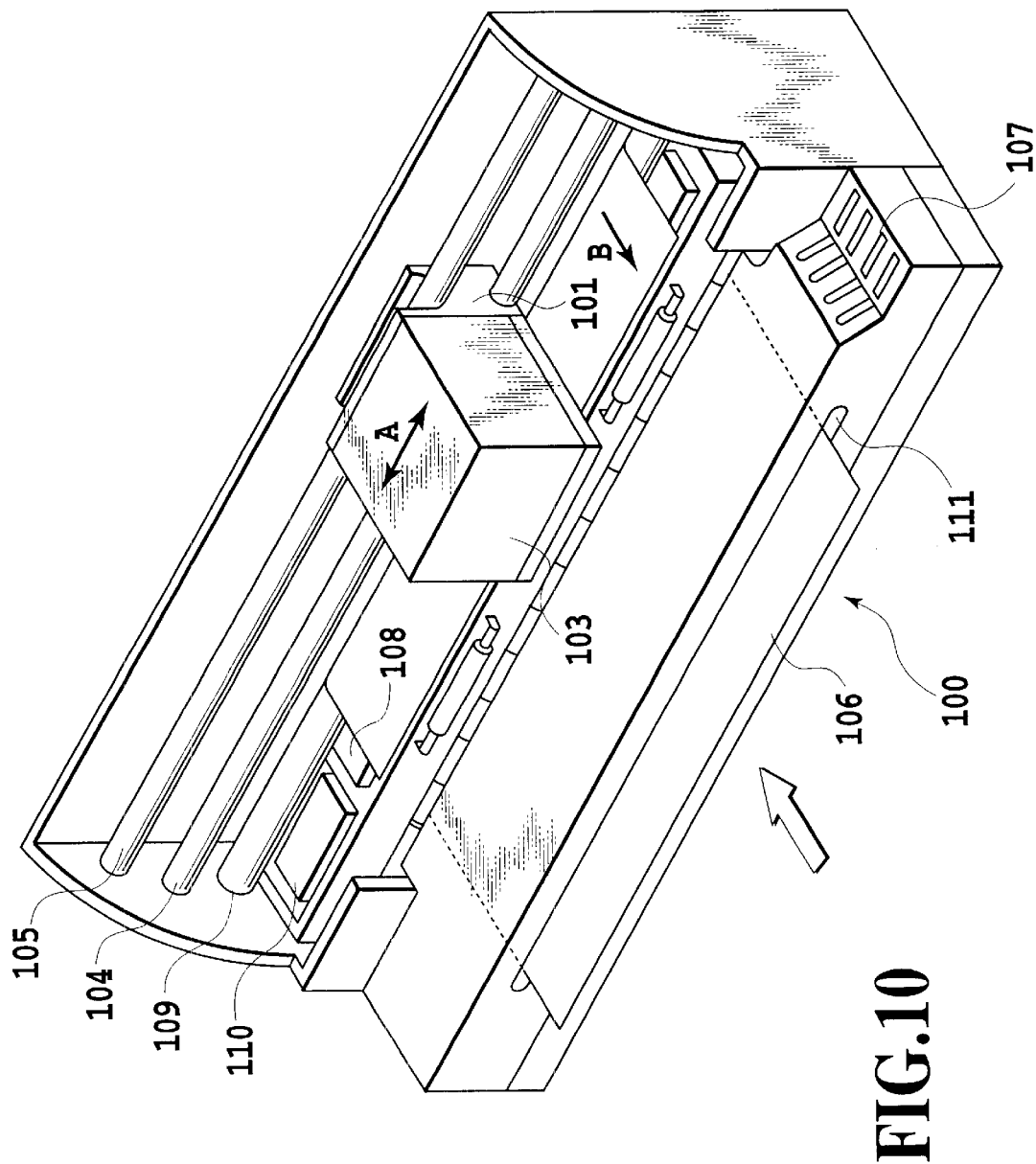
FIG. 10 is a perspective view of an ink-jet printing apparatus to which the present invention can be applied.

FIG. 10 shows a configuration of an ink-jet printing apparatus to which the present invention can be applied.

In FIG. 10, a printing medium 106 inserted into the sheet feed position of a printing apparatus 100 is carried to the printable area of a printing-head unit 103 by a feed roller 109. A platen 108 is set to the bottom of the printing medium 106 in the printable area. A carriage 101 is movable in the main scanning direction shown by an arrow A determined by two guide shafts 104 and 105 to reciprocally scan in a printing area. An arrow B shows the sub-scanning direction intersecting the main scanning direction shown by the arrow A and the printing medium 196 is carried in the sub-scanning direction in the printing area. A printing-head unit 103 including printing heads capable of ejecting a plurality of color inks and ink tanks for supplying ink to each printing head is mounted on the carriage 101. Colors of inks used by the ink-jet printing apparatus of this embodiment include such four colors as black (Bk), cyan (C), magenta (M), and yellow (Y).

A recovery system unit 110 is set to the left-end bottom of the movable area of the carriage 101 to cap the ejection ports of the printing heads. The left end of the movable area of the carriage 101 is set as the home position of the printing heads. The reference numeral 107 denotes a switch section and a display element section. The switch section is used to turn on/off the printing apparatus and to set various printing modes or the like and the display section displays a state of the printing apparatus.

Figure 11:
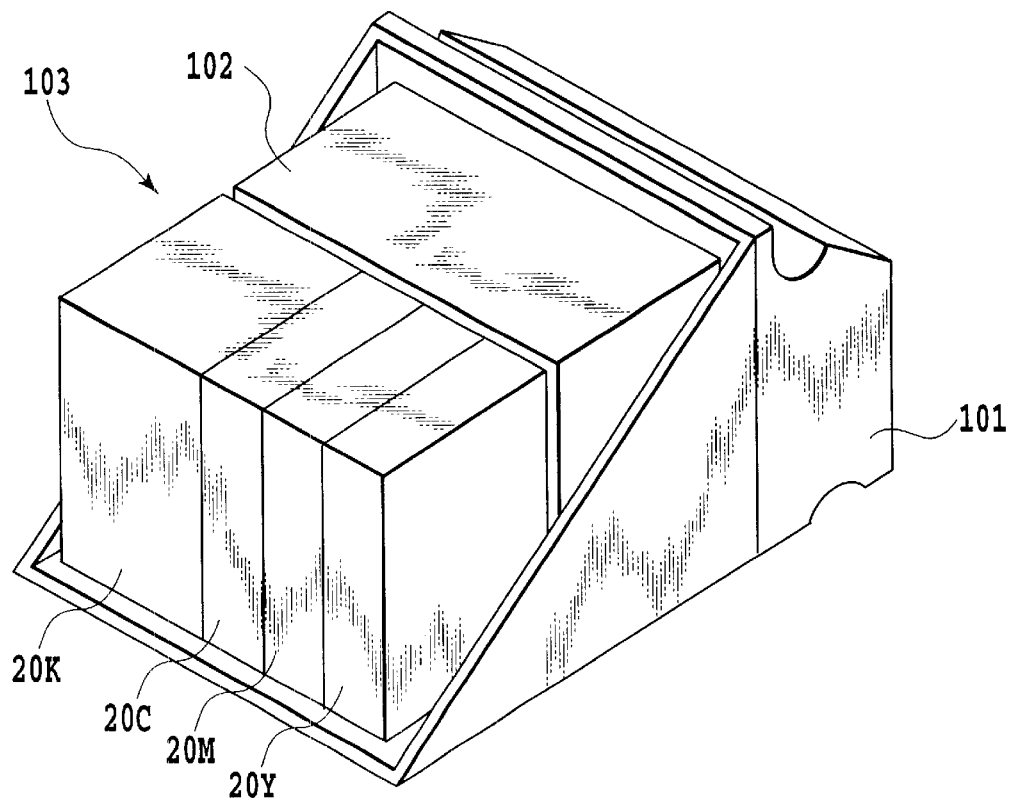
FIG. 11 is a perspective view of the printing head unit in FIG. 10.

FIG. 11 is a perspective view of a printing-head unit 103. In case of this example, tanks of color inks of black (Bk), cyan (C), magenta (M), and yellow (Y) can be independently replaced. A printing head 102 for ejecting inks of Bk, C, M, and Y and a Bk-ink tank 20K, a C-ink tank 20C, an M-ink tank 20M, and a Y-ink tank 20Y are mounted on the carriage 101. The tanks 20K, 20C, 20M, and 20Y supply inks to the ink ejection ports of the printing head 102 through the joint with the printing head 102. In addition to this example, it is permitted to unite the tanks 20K, 20C, 20M and 20Y into one body or unite the tanks 20C, 20M, and 20Y into one body independently of the tank 20K.

Figure 12:
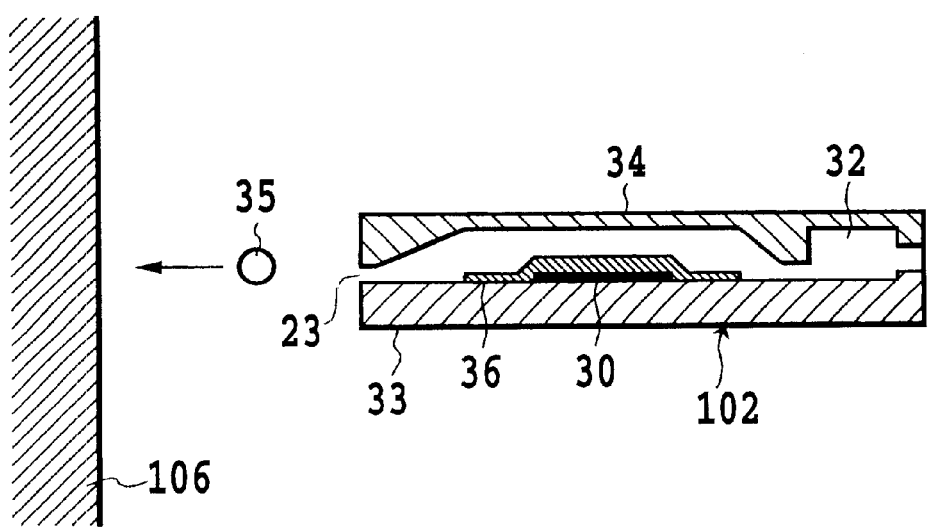
FIG. 12 is a sectional view of an essential portion of the printing head in FIG. 11.

FIG. 12 is an enlarged sectional view of an essential portion of the printing head 102 in FIG. 11. In case of the printing head 102 of this example, a heater 30 serving as an electrothermal transducer is arranged correspondingly to each ink ejection port 23 configuring each nozzle. By applying a driving signal corresponding to printing information to the heater 30, ink is ejected from the ink ejection port 23. The heater 30 can independently produce heat in every nozzle. The ink in a nozzle quickly heated by the heat of the heater 30 forms bubbles by film boiling and is ejected toward a printing medium 106 as an ink droplet 35 as shown in FIG. 12. The ink droplet 35 forms a character or an image on the printing medium 106. In this case, the volume of each color ink droplet ejected ranges between 10 to 100 ng.

An ink passage communicating with each ejection port 23 is formed. A common liquid chamber 32 for supplying ink to the ink passages is provided for the rear of the portion where the ink passages are arranged. The heater 30 serving as an electrothermal transducer for generating thermal energy used to eject ink droplets from the ejection ports 23 and an electrode wiring for supplying power to the heater 30 are provided for the ink passage corresponding to each ejection port 23. The heater 30 and the electrode wiring are formed on a substrate 33 made of silicon by a film-forming process in semiconductor art. A protective film 36 is formed on the heater 30 so that ink does not directly contact with the heater 30. Moreover, a partition 34 made of resin or glass is superimposed on the substrate 33 and thereby, the ejection ports 23, ink passages, and common liquid chamber 32 are configured.

The printing system for ejecting ink by using a heater serving as an electrothermal transducer is generally referred to as a bubble-jet printing system because bubbles formed by thermal energy are used when ejecting ink.

Figure 13:
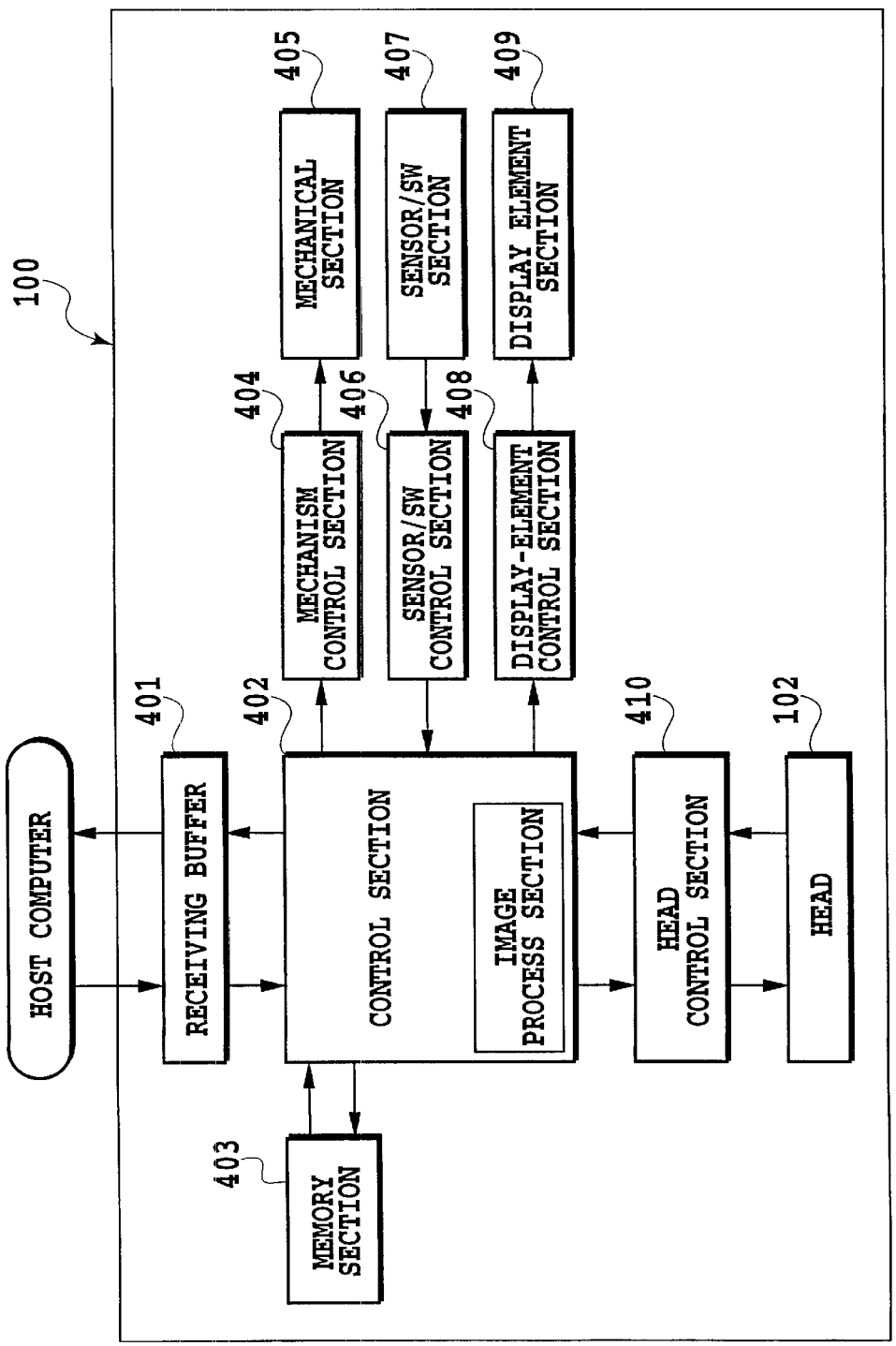
FIG. 13 is a block diagram of the control system of the ink-jet printing apparatus in FIG. 10.

FIG. 13 is a block diagram of the control system of an ink-jet printing apparatus to which the present invention can be applied. Characters and image data to be printed (hereafter referred to as "image data") are input to the receiving buffer 401 of a printing apparatus 100 from a host computer. Moreover, the data for confirming whether data is correctly transferred or the data for communicating a state of the printing apparatus 100 are returned to the host computer from the printing apparatus 100. The data in the receiving buffer 401 is transferred to a memory section 403 and temporarily stored in a RAM (random access memory) under control by a CPU 402.

A memory control section 404 drives a mechanical section 405 such as a carriage motor or line feed motor in accordance with a command output from the CPU 402. A sensor/SW control section 406 transmits a signal output from a sensor/SW section 407 configured by various sensors and SWs (switches) to the CPU 402. A display-element control section 408 controls a display element section 409 configure by the LED of a display panel group and a liquid-crystal display element in accordance with a command output from the CPU 402. A printing-head control section 410 controls a printing head 102 in accordance with a command output from the CPU 402. Moreover, the printing-head control section 410 senses the temperature information showing a state of the printing head 102 and transmits the information to the CPU 402.

(Other)

The present invention achieves distinct effect when applied to a printing head or a printing apparatus which has means for generating thermal energy such as electrothermal transducers or laser light, and which causes changes in ink by the thermal energy so as to eject ink. This is because such a system can achieve a high density and high resolution printing.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet printing systems, it is particularly suitable for the on-demand type apparatus. This is because the on-demand type apparatus has electro-thermal transducers, each disposed on a sheet or liquid passage that retains liquid (ink), and operates as follows: first, one or more drive signals are applied to the electro-thermal transducers to cause thermal energy corresponding to printing information; second, the thermal energy induces sudden temperature rise that exceeds the nucleate boiling so as to cause the film boiling on heating portions of the printing head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better printing.

U.S. Pat. Nos. 4,558,333 and 4,459,600 disclose the following structure of a printing head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the printing head, the present invention can achieve printing positively and effectively.

The present invention can be also applied to a so-called full-line type printing head whose length equals the maximum length across a printing medium. Such a printing head may consists of a plurality of printing heads combined together, or one integrally arranged printing head.

In addition, the present invention can be applied to various serial type printing heads: a printing head fixed to the main assembly of a printing apparatus; a conveniently replaceable chip type printing head which, when loaded on the main assembly of a printing apparatus, is electrically connected to the main assembly, and is supplied with ink therefrom; and a cartridge type printing head integrally including an ink reservoir.

It is further preferable to add a recovery system, or a preliminary auxiliary system for a printing head as a constituent of the printing apparatus because they serve to make the effect of the present invention more reliable. Examples of the recovery system are a capping means and a cleaning means for the printing head, and a pressure or suction means for the printing head. Examples of the preliminary auxiliary system are a preliminary heating means utilizing electrothermal transducers or a combination of other heater elements and the electrothermal transducers, and a means for carrying out preliminary ejection of ink independently of the ejection for printing. These systems are effective for reliable printing.

The number and type of printing heads to be mounted on a printing apparatus can be also changed. For example, only one printing head corresponding to a single color ink, or a plurality of printing heads corresponding to a plurality of inks different in color or concentration can be used. In other words, the present invention can be effectively applied to an apparatus having at least one of the monochromatic, multi-color and full-color modes. Here, the monochromatic mode performs printing by using only one major color such as black. The multi-color mode carries out printing by using different color inks, and the full-color mode performs printing by color mixing.

Furthermore, although the above-described embodiments use liquid ink, inks that are liquid when the printing signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the printing medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the printing signal. In such cases, the ink may be retained in recesses or through holes formed in a porous sheet as liquid or solid substances so that the ink faces the electrothermal transducers as described in Japanese Patent Application Laying-open Nos. 54-56847 (1979) or 60-71260 (1985). The present invention is most effective when it uses the film boiling phenomenon to expel the ink.

Furthermore, the ink jet printing apparatus of the present invention can be employed not only as an image output terminal of an information processing device such as a computer, but also as an output device of a copying machine including a reader, and as an output device of a facsimile apparatus having a transmission and receiving function.

The object of the present invention can also be achieved by supplying the medium which records the software program codes for realizing the functions in the above embodiments to a system or an apparatus and letting those program codes read by the system or a computer (or the CPU/MPU) of the apparatus from the medium.

In this case, the program codes read from the printing medium realizes the functions of the object embodiment and the printing medium storing the program codes comes to compose the present invention.

The printing medium for supplying the above program codes may be, for example, a floppy disk, a hard disk, an optical disk, an optical magnetic disk, a CD-ROM, a CD-R, a magnetic tape, a non-volatile memory card, a ROM, or the like.

The present invention also includes a case in which the functions of the embodiments described above are realized through some or the whole of the actual processings executed not only by a computer which reads and executes the program codes, but also by an OS (Operating System) running on a computer according to the directions of the program codes.

The present invention also includes a case in which the program codes read from the printing medium are written in a memory provided in a function extension board set in a computer or a function extension unit connected to the computer, then the function extension board or the CPU of the function extension unit executes some or the whole processings acccording to the directions of the program codes, thereby realizing the functions of the embodiments described above.

The present invention is not limited to the embodiments in the foregoing, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for printing an image on a printing medium in accordance with print data obtained through a development which develops quantized image data by using a pattern corresponding to a quantization level of the image data, comprising:
    setting means that selectively sets more than one type of the pattern for a same quantization level of at least one quantization level of the image data;
    detection means that detects a discontinuous area of the image to be printed on the printing medium; and
    change means that changes the type of the pattern to be set by the setting means when the image currently being printed on the printing medium reaches the discontinuous area of the image detected by the detection means.

2. The printing apparatus as claimed in claim 1, wherein the image data is data quantized into N values (N≧2).

3. The printing apparatus as claimed in claim 1, further comprising quantization means for quantizing the image data.

4. The printing apparatus as claimed in claim 1, wherein the detection means detects a boundary of the image as the discontinuous area.

5. The printing apparatus as claimed in claim 1, wherein the detection means detects an area between pages of the printing medium as the discontinuous area of the image.

6. The printing apparatus as claimed in claim 1, wherein the detection means detects an area between images having a predetermined width or more as the discontinuous area of the image.

7. The printing apparatus as claimed in claim 1, wherein the change means sets the type of the pattern to be set by the setting means by using a random number at the start of printing the image on the printing medium.

8. The printing apparatus as claimed in claim 1, further comprising a plurality of printing elements which prints the image on the printing medium in accordance with the print data obtained through the development.

9. The printing apparatus as claimed in claim 8, wherein the printing element is an ink-jet printing element capable of ejecting ink from an ink ejection port.

10. The printing apparatus as claimed in claim 9, wherein the ink-jet printing element has an electrothermal transducer for generating thermal energy used to eject ink.

11. The printing apparatus as claimed in claim 8, further comprising:
    a printing head provided with the printing element;
    first movement means for relatively moving the printing head in relation to the printing medium in a main scanning direction; and
    second movement means for relatively moving the printing medium in relation to the printing head in a sub-scanning direction intersecting the main scanning direction.

12. A printing method for printing an image on a printing medium in accordance with print data obtained through a development which develops quantized image data by using a pattern corresponding to a quantization level of the image data, comprising the steps of:
    setting a type of the pattern from among more than one type of the pattern for a same quantization level of at least one quantization level of the image data;
    changing types of the patterns to be set when the image currently being printed on the printing medium reaches a discontinuous area of the image;

developing the quantized image data to the print data in accordance with the set pattern; and printing the image in accordance with the print data.

13. The printing method as claimed in claim 12, wherein the image data is data quantized into N values (N≧2).

14. The printing method as claimed in claim 12, wherein the discontinuous area of the image is a boundary of the image.

15. The printing method as claimed in claim 12, wherein the discontinuous area of the image is present between pages of the printing medium.

16. The printing method as claimed in claim 12, wherein the discontinuous area of the image is an area between images having a predetermined width or more.

17. The printing method as claimed in claim 12, wherein the type of the pattern is set by using a random number at the start of printing the image on the printing medium.

18. The printing method as claimed in claim 12, wherein images are printed on the printing medium by using a plurality of printing elements in accordance with the print data obtained through the development.

19. The printing method as claimed in claim 18, wherein the printing element is an ink-jet printing element capable of ejecting ink from an ink ejection port.

20. The printing method as claimed in claim 19, wherein the ink-jet printing element has an electrothermal transducer for generating thermal energy used to eject ink.

21. The printing method as claimed in claim 18, wherein the image is printed on the printing medium by using a printing head provided with the printing element, and when the image is printed, the printing head is moved in relation to the printing medium in a main scanning direction and the printing medium is moved in relation to the printing head in a sub-scanning direction intersecting the main scanning direction.

22. A data processing method for processing data to be used in a printing apparatus for printing an image on a printing medium, comprising the steps of:

quantizing image data corresponding to the image to be printed on the printing medium;

detecting a discontinuous area of the image to be printed on the printing medium in accordance with the image data; and selecting and setting a pattern corresponding to the quantized image data, wherein the pattern is set based on a selection from more than one type of the pattern for a same quantization level corresponding to a predetermined quantization level, and the set pattern is changed in accordance with detection results of the detecting step.

23. The data processing method as claimed in claim 22, wherein the image data is data quantized into N values (N≧2).

24. The data processing method as claimed in claim 22, wherein the discontinuous area of the image is a boundary of the image.

25. The data processing method as claimed in claim 22, wherein the discontinuous area of the image is present between pages of the printing medium.

26. The data processing method as claimed in claim 22, wherein the discontinuous area of the image is an area between images having a predetermined width or more.

* * * * *

UNITED STATES PATENT AND TRADEMARK OFFICE
CERTIFICATE OF CORRECTION

PATENT NO. : 6,738,160 B1
DATED : May 18, 2004
INVENTOR(S) : Kato et al.

It is certified that error appears in the above-identified patent and that said Letters Patent is hereby corrected as shown below:

Title page,
Item [30], Foreign Application Priority Data,
"10/306132" should read -- 10-306132 --
Item [56], References Cited, U.S. PATENT DOCUMENTS,
"2/1994 Kato" should read -- 2/1994 Kato et al. --.

Column 6,
Line 4, "image" should read -- images --;
Line 35, "purposes." should read -- proposes. --; and
Line 36, "purposes" should read -- proposes --.

Column 7,
Line 49, "The" should be deleted.

Column 10,
Line 20, "Laying-open" should read -- Laid-open --; and
Line 33, "consists" should read -- consist --.

Column 11,
Line 23, "Laying-open" should read -- Laid-open --; and
Line 39, "realizes" should read -- realize --.

Signed and Sealed this

Sixteenth Day of November, 2004

JON W. DUDAS
*Director of the United States Patent and Trademark Office*